Feb. 2, 1926.
A. H. PERKINS
1,571,869
FISH CATCHING DEVICE
Filed May 7, 1925
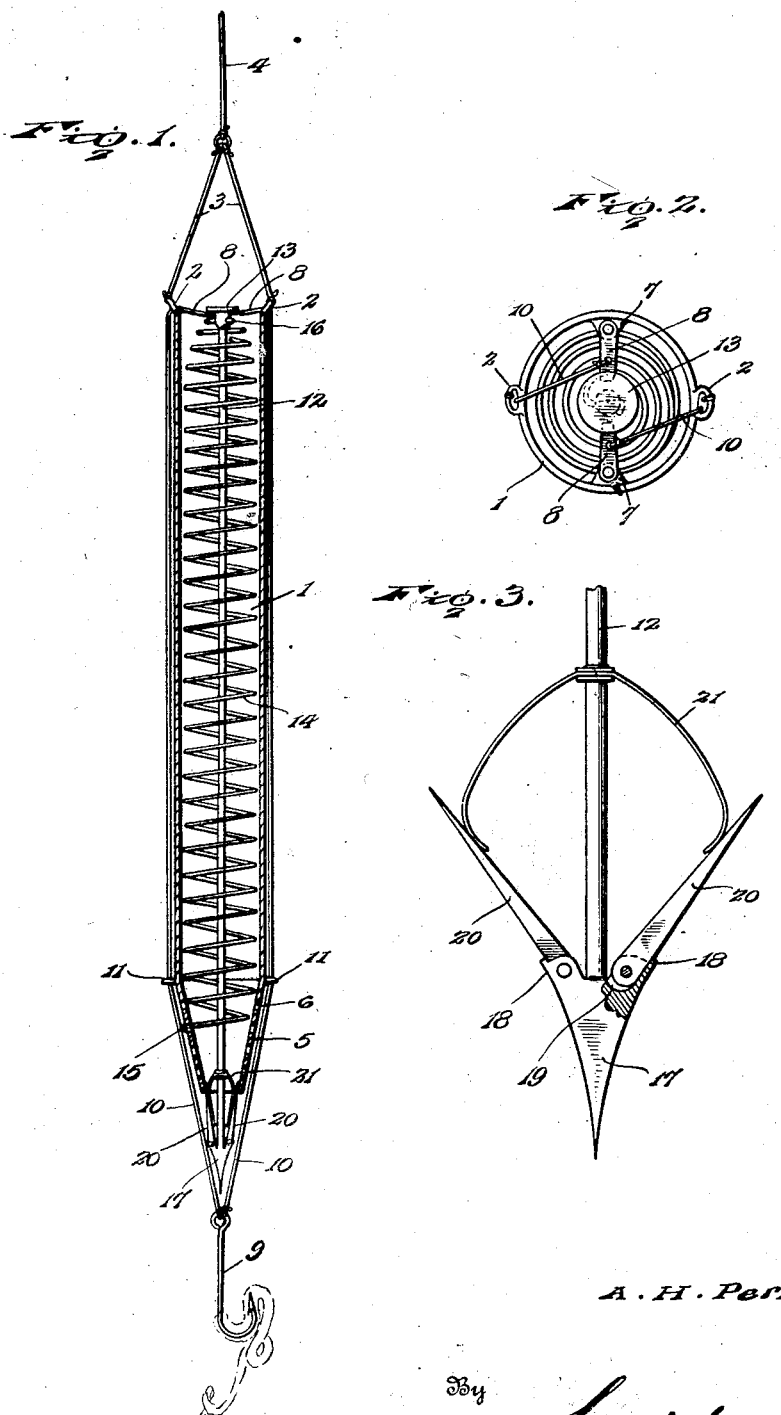
Inventor
A. H. Perkins.
By Lacy & Lacy, Attorneys Patented Feb. 2, 1926.

1,571,869

UNITED STATES PATENT OFFICE.

ANDREW H. PERKINS, OF HELENA, MISSISSIPPI.

FISH-CATCHING DEVICE.

Application filed May 7, 1925. Serial No. 28,729.

*To all whom it may concern:*

Be it known that I, ANDREW H. PERKINS, a citizen of the United States, residing at Helena, in the county of Jackson and State of Mississippi, have invented certain new and useful Improvements in Fish-Catching Devices, of which the following is a specification.

This invention relates to fish-catching devices and has for its object the provision of means whereby after a fish nibbles at bait upon a hook an impaling device will be released and automatically projected into the fish's mouth so as to effectually prevent him from releasing the hook. The invention seeks to provide a device which may be employed in the manner of the ordinary fish hook and which will include a normally retracted spear or impaling member and means whereby, when a strain is placed upon the hook, the impaling device will be released and projected to catch the fish. The invention is illustrated in the accompanying drawing and will be hereinafter fully set forth.

In the drawing:

Figure 1 is a sectional elevation of a device embodying my invention;

Fig. 2 is an enlarged top plan view of the same;

Fig. 3 is an enlarged sectional elevation of the working end of the impaling device.

In carrying out the invention, I employ a tubular casing 1 which is provided at its upper end with eyes 2 to which the ends of short branches 3 are attached to connect the tube with the fishing line 4. The lower end of this tubular casing 1 is tapered, as shown at 5, and is provided with perforations 6 so that water may drain therefrom when it is withdrawn to remove the catch from the hook. The lower extremity of the casing is open so as to provide free egress of the impaling device and at the upper end of the casing are provided diametrically opposite lugs 7 to which are pivoted laterally swinging latches 8. The hook 9 may be of any approved form and is carried by strings 10 which pass longitudinally upon the outer side of the casing and are guided by eyes or loops 11 at the lower end thereof and pass through the eyes 2 at the upper end thereof to be attached to the latches, as clearly shown in Fig. 2. Disposed concentrically within the tubular casing is a shank 12 which may be a light rod or stout wire equipped at its upper end with a laterally expanded head 13, under which the free ends of the latches 8 may engage. A contractile spring 14 is disposed within the casing and has one end attached to the casing, as shown at 15, while its upper end 16 is attached to the shank 12 or to the head 13 thereon. Normally the latches 8 engage under the head 13, as indicated in Fig. 2, so that the shank 12 will be held retracted and housed within the tubular casing. It will be readily seen, however, that when a pull is exerted upon the hook 9, as by a fish nibbling at the bait, the pull will be transmitted through the strings 10 to the latches 8 and said latches will be swung laterally about their pivots so as to pass from under the edge of the head 13, whereupon the spring 14 will contract and project the shank. The lower end of the shank 12 is normally beyond the lower end of the casing and is formed into or has secured thereon a point 17 which is preferably in the form of an arrow head. At the upper wider end of this head or point 17 are seats or lugs 18 which are disposed at opposite sides of the shank and are recessed on their inner sides, as shown at 19, to accommodate the wings 20 which are pivoted to the shank 12 or, perferably, in said notches or seats. A bowed spring 21 is secured at its center to the shank 12 and bears at its ends against the inner sides of the respective wings 20 so that it tends constantly to expand or swing the said wings outwardly.

Initially, the free upper ends of the wings 20 are held in closed contracted relation by fitting within the lower end of the tube, as shown in Fig. 1. When a fish bites, however, and the shank is projected through the release and contraction of the spring 14, the free ends of the wings 20 are carried outwardly beyond the end of the tube and the spring 21 then at once expands and swings the said wings outwardly so that their free ends will engage in the jaws of the fish and effectually impale him so that he cannot liberate himself. It will be understood, of course, that the ends of the strings 10 are permanently attached to the latches 8 so that, when the latches are moved from under the head 13, the strings will not be released and, consequently, the hook 9 will not be lost.

My improved device is exceedingly simple and compact and its efficiency is thought to be obvious.

Having thus described the invention, I claim:

1. A fish-catching device comprising a casing, a hook suspended upon the casing, a shank housed within the casing, a piercing point on the end of the shank, wings pivoted at the base of said point and foldable upon the shank whereby they may be engaged within the lower end of the casing, a spring carried by the shank and bearing upon said wings to spread the same, means connected with the hook for normally holding the shank retracted, and means within the casing to project the shank when said holding means is released.

2. A fish-catching device comprising a tubular casing, a shank mounted within the casing and having an expanded head at its upper end, latches pivotally mounted at their outer ends upon the end of the casing for movement in a diametrical plane of the casing and engageable at their free ends under said head, a hook, strings mounted upon the casing and attached to the said hook at their lower ends and to the latches at their upper ends, an impaling point carried by the lower end of the shank, and a contractile spring attached at its lower end to the casing and at its upper end to the head of the shank.

In testimony whereof I affix my signature.

ANDREW H. PERKINS. [L. S.]